United States Patent
McAndrew et al.

(10) Patent No.: US 11,677,749 B2
(45) Date of Patent: Jun. 13, 2023

(54) ASSESSING CONDITION OF REAL-WORLD OBJECTS

(71) Applicant: So-Sure Limited, London (GB)

(72) Inventors: Patrick Scott McAndrew, London (GB); Julien Champagne, London (GB)

(73) Assignee: So-Sure Limited, London (GB)

( * ) Notice: Subject to any disclaimer, the term of this patent is extended or adjusted under 35 U.S.C. 154(b) by 74 days.

(21) Appl. No.: 17/268,439

(22) PCT Filed: Aug. 9, 2019

(86) PCT No.: PCT/EP2019/071430
§ 371 (c)(1),
(2) Date: Feb. 12, 2021

(87) PCT Pub. No.: WO2020/035410
PCT Pub. Date: Feb. 20, 2020

(65) Prior Publication Data
US 2021/0312175 A1    Oct. 7, 2021

(30) Foreign Application Priority Data
Aug. 15, 2018 (GB) ..................... 1813348

(51) Int. Cl.
*G06V 20/00* (2022.01)
*H04L 9/40* (2022.01)
*G06F 18/22* (2023.01)
(52) U.S. Cl.
CPC .......... *H04L 63/0876* (2013.01); *G06F 18/22* (2023.01)

(58) Field of Classification Search
CPC ...... G06V 20/00; G06K 9/6201; G06Q 10/20; H04W 12/61; H04W 12/71; H04W 12/77; H04L 63/0876
See application file for complete search history.

(56) References Cited

U.S. PATENT DOCUMENTS

| | | | |
|---|---|---|---|
| 8,712,893 B1 | 4/2014 | Brandmaier et al. | |
| 11,428,896 B2 * | 8/2022 | Good | G06K 7/10722 |
| 11,429,883 B2 * | 8/2022 | Dotan-Cohen | G06F 3/038 |
| 2012/0314242 A1 * | 12/2012 | Kakutani | H04N 1/00867 358/1.14 |
| 2017/0270650 A1 * | 9/2017 | Howe | G06F 18/24133 |
| 2018/0225023 A1 * | 8/2018 | Li | G06F 3/0488 |
| 2018/0293664 A1 * | 10/2018 | Zhang | G06V 10/82 |
| 2018/0322472 A1 * | 11/2018 | Russell | G06Q 30/0645 |

(Continued)

FOREIGN PATENT DOCUMENTS

| WO | 2009149376 A1 | 12/2009 |
|---|---|---|
| WO | 2012113084 A1 | 8/2012 |

OTHER PUBLICATIONS

International Search Report and Written Opinion for Application No. PCT/EP2019/071430, dated Sep. 23, 2019.

*Primary Examiner* — Ming Y Hon
(74) *Attorney, Agent, or Firm* — Stoel Rives LLP

(57) ABSTRACT

A computer-implemented method of assessing the condition of a real-world object is provided. The computer-implemented method comprises: receiving sensor data depicting the real-world object; authenticating the received sensor data as genuinely depicting the real-world object; and if the authentication is successful, assessing a condition of the real-world object from the sensor data.

10 Claims, 14 Drawing Sheets

(56) References Cited

U.S. PATENT DOCUMENTS

| | | | |
|---|---|---|---|
| 2019/0121913 A1* | 4/2019 | Singh | G06K 19/06037 |
| 2020/0100744 A1* | 4/2020 | Terakado | A61B 1/046 |
| 2020/0143481 A1* | 5/2020 | Brown | G06Q 40/08 |
| 2020/0236343 A1* | 7/2020 | Holzer | G06T 15/10 |
| 2020/0327743 A1* | 10/2020 | Cannarsa | G06Q 40/08 |
| 2021/0081698 A1* | 3/2021 | Lindeman | G06Q 30/0278 |
| 2021/0195133 A1* | 6/2021 | Alm | H04N 7/08 |
| 2022/0180411 A1* | 6/2022 | Cornelison | G06N 3/006 |
| 2022/0284904 A1* | 9/2022 | Pu | H04L 51/52 |

* cited by examiner

ASSESSING CONDITION OF REAL-WORLD OBJECTS

RELATED APPLICATIONS

This application is a U.S. National Stage filing under 35 U.S.C. § 371 of PCT Application No. PCT/EP2019/071430, filed Aug. 9, 2019, which claims priority to EP Application No. 1813348.8 filed Aug. 15, 2018, which applications are incorporated herein by reference in their entirety, for any purpose.

BACKGROUND

There is an increasing need to assess the condition of real-world objects for a variety of reasons, including maintenance, security and others.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect provides a computer-implemented method of assessing the condition of a real-world object comprising: receiving sensor data depicting the real-world object; authenticating the received sensor data as genuinely depicting the real-world object; and if the authentication is successful, assessing a condition of the real-world object from the sensor data.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF DRAWINGS

Embodiments of the invention will be described, by way of example, with reference to the following drawings, in which.

DETAILED DESCRIPTION

Figure 1:
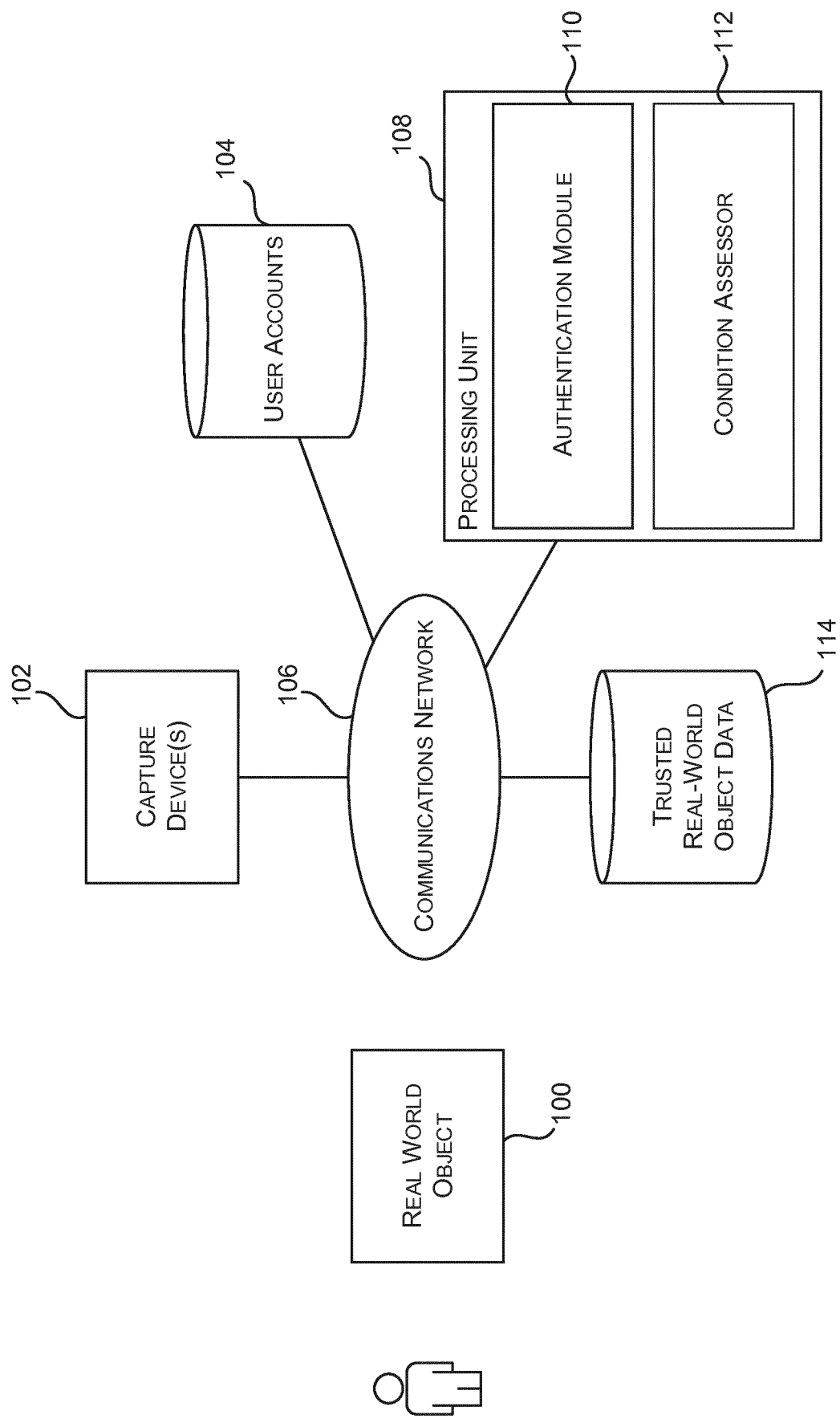
FIG. 1 is a schematic diagram of an image processing apparatus for automatically assessing condition of real world objects.

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The present invention relates to the assessment of condition of real-world objects. The present invention is also concerned with how to authenticate sensor data depicting a specified real-world object as genuinely depicting the specified real-world object.

In particular, the invention relates to a computer-implemented method for assessing the condition of a real-world object (RWO). The computer-implemented method involves receiving sensor data at a device, a server, a sensor and/or other receivers. The sensor data depicts, or is considered or expected to depict, the real-world object whose condition is to be assessed. The method includes two additional actions: (1) authenticate the sensor data as genuinely depicting the real-world object; and (2) assess the condition of the real-world object depicted in the sensor data. The assessment of condition and authentication may be performed in sequence, with the assessment being carried out only if the real-world object is considered to be genuinely depicted by the sensor data. It may be possible to perform the assessment and authentication simultaneously or to perform the assessment before authentication.

In an example there is a computer-implemented method of assessing the condition of a real-world object in the form of an electronic device, the method comprising:
obtaining, using the electronic device, sensor data depicting the electronic device, the sensor data comprising one or more images depicting a graphical item on a display screen of the electronic device, the graphical item comprising an identifier of the electronic device;
wherein one of the images depicts the graphical item at a first portion of the display screen and a second one of the images depicts the graphical item at a second portion of the display screen, different from the first portion;
authenticating the obtained sensor data as genuinely depicting the electronic device; and if the authentication is successful, sending the sensor data depicting the electronic device to a condition assessor configured to perform computer-implemented assessment of the condition of the electronic device from the sensor data. As a result of the graphical item comprising an identifier of the electronic device an efficient and effective way of authenticating the obtained sensor data is possible. The presence of the graphical item makes it harder to assess the condition of the real-world object from the sensor data. By using the first and second portions which are different accuracy of the condition assessment is improved.

Turning now to the figures, FIG. 1 illustrates a user, a real-world object 100 whose condition is to be assessed, and a system for assessing the condition of the real-world object 100. The real-world object 100 may be any real-world object, for example an electronic device such as a smart phone, a television, a laptop computer or other electronic device, a work of art such as a painting or vase, an antique such as an item of furniture, or clothing.

The system comprises one or more capture devices 102, a data store 104 storing user account data, a data store 114 storing trusted real-world object data, and a processing unit 108. The capture device 102, data stores 104, 114, and processing unit 108 are connected to one another by a communications network 106. The system and its components may form part of a single device, or may be parts of other devices. In some embodiments, the real-world object 100 incorporates part or all of the system as described in more detail with reference to FIG. 6 later in this document.

The capture device 102 is a device capable of capturing sensor data that depicts the real-world object 100. The capture device 102 may be a sensor, for example an image sensor that captures images in the form of digital photographs or videos. A non-exhaustive list of examples of capture device comprising image sensors is: web camera, smart phone camera, video camera, depth camera, stereo camera, range scanner, digital camera. The capture device 102 may comprise a plurality of sensors of different modalities or types whose data collectively forms the sensor data that is used to depict the real-world object. The capture device 102 may be a device capable of connecting to a sensor or plurality of sensors and receiving sensor data from them. The capture device 102 may incorporate features that enhance the capture of the sensor data. It is envisaged that many varied forms of sensor data might be used, including acoustic, optical, movement (i.e. acceleration or vibration), or chemical data.

The data store 104 storing user account data may also be referred to as the user account (UA) data store 104. The UA data store 104 stores trusted identifiers of real-world objects and details of user accounts associated with the real-world objects. In various examples, the user accounts hold details about individuals who have registered with a service such as a condition assessment service. The UA data store 104 may store data indicating the type of sensor data expected to be received, the capture device used by the user, historical data and other data. The UA data store 104 may include user-specific identifiers.

The data store 114 storing trusted real-world object data may also be referred to as the real-world object (RWO) data store 114. The RWO data store 114 stores data relating to real-world objects whose condition may need to be assessed. For example, the RWO data store 114 may include, for each of a plurality of real-world objects, data relating to the real-world object such as dimensions, colour, current condition, and/or images or videos of the object. In some examples, the RWO data store 114 stores, for individual ones of a plurality of real-world objects, previously gathered sensor data depicting the real-world object.

The data stored in the RWO data store 114, and associated with a specified real-world object, is trusted in that it is assumed to genuinely depict or be about the specified real-world object. A secure process for storing data in the RWO data store 114 is used in some examples, such as using through the use of password protection and/or cryptography. The RWO data store 114 is preferably secure to prevent tampering by unauthorised parties.

In some embodiments, the RWO data store 114 is distributed. In an example, part of the RWO data store 114 is stored at the real-world object, such as where the real-world object is a computer, and another part of the RWO data store 114 is located elsewhere, such as on a remote server accessible via a communications network.

The processing unit 108 has an authentication module 110. The authentication module 110 receives sensor data captured by the capture device 102 and authenticates the sensor data by verifying whether the real-world object 100 is genuinely depicted by the sensor data. The authentication module 110 utilises data stored in the UA data store 104 and/or the RWO data store 114 to perform the authentication. In some examples the authentication module 110 assesses time information associated with the sensor data it receives to assess the age of the sensor data or part of it.

The processing unit 108 has a condition assessor 112. The condition assessor 112 receives sensor data captured by the capture device 102 and assesses a condition of the real-world object 100 based on the sensor data. The condition assessor 112 may operate in response to confirmation from the authentication module 110 that the sensor data depicts the real-world object 100. The same sensor data may be used by the authentication module 110 and the condition assessor 112. The condition assessor 112 may utilise data from the UA data store 104 and/or RWO data store 114. The term 'condition' is intended to encompass the general, physical state of the real-world object, including surface damage and any other damage that is discernible using a depiction of the object.

The communications network 106 comprises one or more means of data transfer to connect the system components. For example, the communications network 106 comprises the internet, a localised network, and/or internal connections within a device.

Figure 2:
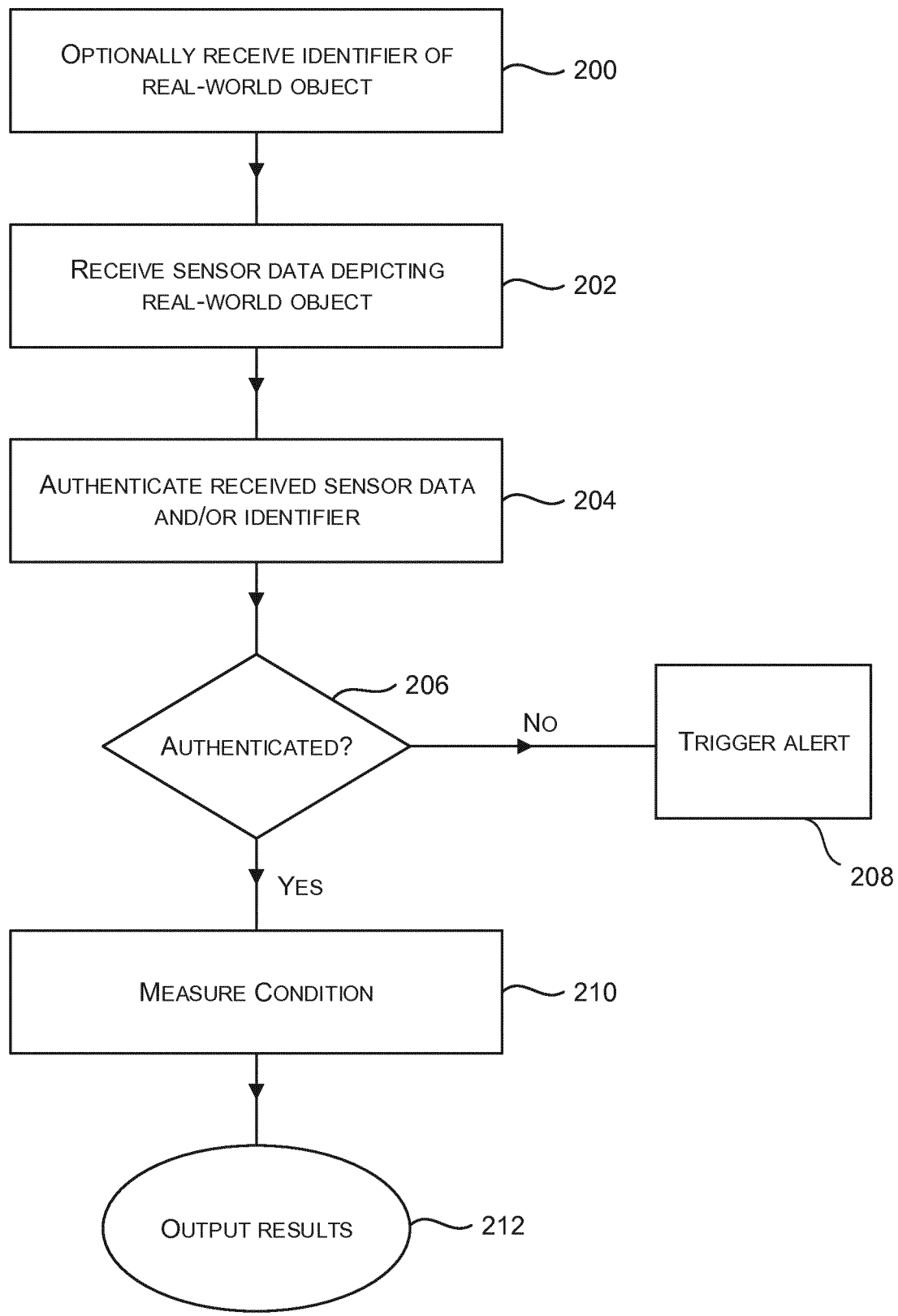
FIG. 2 is a flow chart illustrating a method of operation of the apparatus of FIG. 1 to assess condition of real world objects.

The processing unit 108 shown in FIG. 1 operates generally according to the method of FIG. 2. FIG. 2 illustrates a computer-implemented method of assessing the condition of a real-world object. The method of FIG. 2 is carried out using the authentication module 110 and the condition assessor 112 of the processing unit 108 which are deployed at one or more web servers in some examples.

The method comprises optionally receiving 200, at the processing unit 108, an identifier of the real-world object 100. In an example the identifier is a number, such as an International Mobile Equipment Identity (IMEI) or other number which identifies an electronic device, where the real-world object 100 is the electronic device. An IMEI is a number, usually unique, which identifies third generation partnership project (3GPP) and integrated digital enhanced network (iDEN) mobile phones, as well as some satellite phones. In some examples the identifier is integral with sensor data captured by the capture device 102, as will be discussed below in relation to FIG. 5 and FIG. 6.

The method comprises receiving 202, at the processing unit 108, sensor data depicting the real-world object. The capture device 102 captures sensor data depicting the real-world object 100 and sends the sensor data to the processing unit 108 via the communications network 106. In some cases, the received sensor data has integrated with it an identifier of the real-world object 100, but this is not essential.

The received sensor data and/or identifier are authenticated 204 as depicting the real-world object 100, so that it can be confirmed that the real-world object 100 is genuinely depicted by the sensor data. The authentication is done by the authentication module 110 of the processing unit 108. Various different methods of authentication are possible as described later with reference to FIGS. 3 and 4.

At an authentication confirmation step 206 performed by the authentication module 110, it is decided if the sensor data and/or identifier has been authenticated as depicting the real-world object 100. If there is no authentication, an alert is triggered 208. An operator of the processing unit 108 receives the alert and is able to take appropriate steps, such as blocking the user's account or denying a claim. In some cases the user is alerted, or the method may return to an earlier step.

If the sensor data is successfully authenticated, sensor data received from the capture device 102 is used, by the condition assessor 112, to assess 210 the condition of the real-world object 100. The condition assessor 112 is fully automated and uses image processing and/or machine learning components as described in more detail later in this document.

Based on the assessment of the condition of the real-world object 100 via the sensor data, a result of the condition of the real-world object 100 is output 212, either for storing in one of the data stores 104, 114, or for communication back to the user or another interested party. In various examples, the results grade the condition of the real-world object 100 according to a predetermined scale, or comprise an image highlighting damage to the object.

Figure 3:
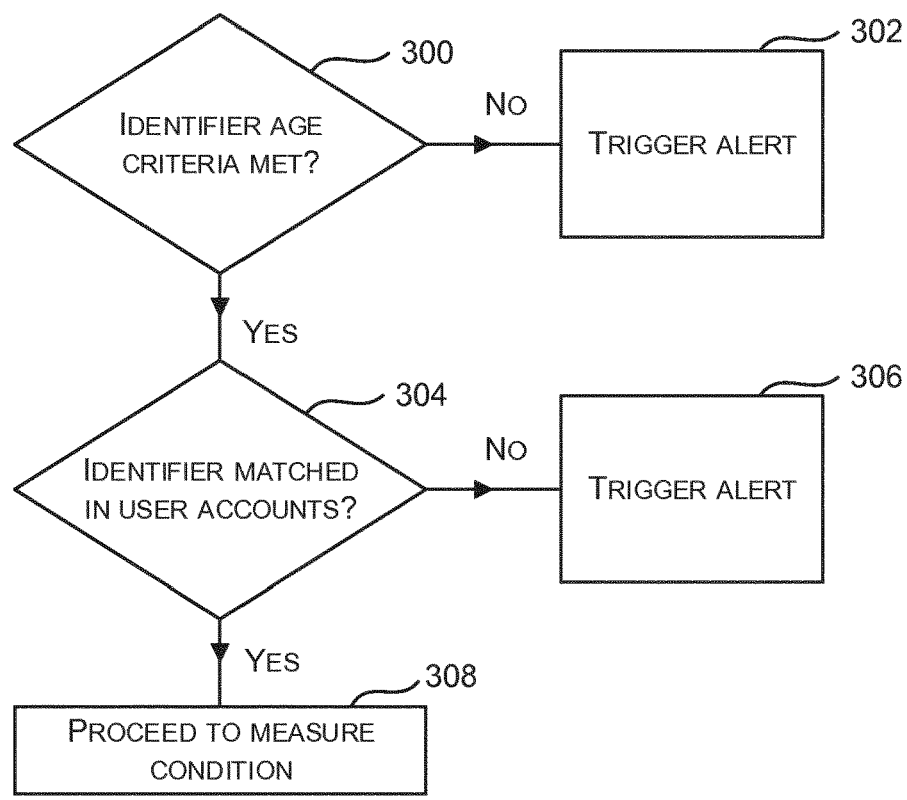
FIG. 3 is a flow chart illustrating an authentication step of the method of FIG. 2 wherein an identifier is used to authenticate sensor data.
Figure 4:
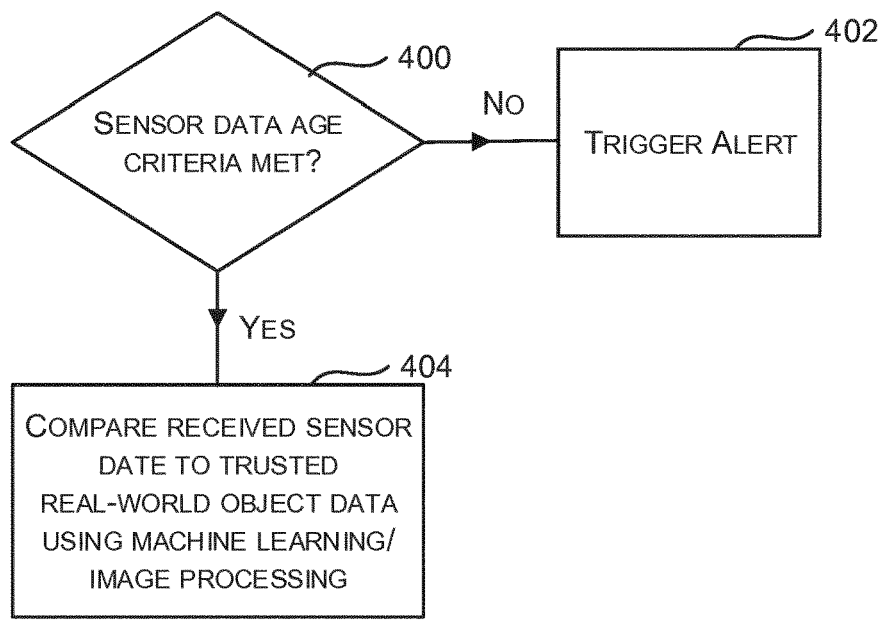
FIG. 4 is a flow chart illustrating another authentication step of the method of FIG. 2.

Methods for authentication of the sensor data and/or the identifier are illustrated in FIGS. 3 and 4. FIG. 3 shows more detail about the decision diamond "authenticated?" in FIG. 2. FIG. 4 shows another example of more detail about the decision diamond "authenticated?" in FIG. 2.

In the example shown in FIG. 3, an identifier of the real-world object 100 has been received by the processing unit 108 and the authentication module 110 carries out authentication by determining 300 if age criteria are met for the identifier. In various examples, the determination includes retrieving age data of the identifier, such as a timestamp, contained within the identifier. The determination may also include calculating a time difference between the retrieved age data and metadata indicating when the identifier was received or captured, or between the retrieved age data and a current time. If the difference is below an age threshold, then the age criteria is met. If not, an alert is triggered 302.

Implementing age criteria enables the authentication module to authenticate the received identifier since if the identifier is below a threshold age it is highly unlikely to have been spoofed or tampered with. In some cases, as will be described below with regard to FIGS. 6 to 11, meeting age criteria also reduces the likelihood of fraud.

If the age criteria are met, a check is done 304 to find whether the identifier is matched in the UA data store 104. If a user account is recorded in the UA data store 104 in association with the identifier then the check is successfully passed. If not, an alert is triggered 306.

In some cases the identifier is encoded in a coded signal such as a bar code or matrix bar code. In this case, the check comprises decoding the identifier from the coded signal before checking to find whether the identifier is matched in the UA data store 104.

In the example of FIG. 3, meeting both the age and identifier criteria described above means that the authentication is considered to be passed. As a result, the method proceeds 308 to a condition assessment step 210. If either of the criteria are not met, an alert is triggered.

In the authentication steps shown in FIG. 4, age criteria for the sensor data is assessed 400. The age criteria are the same age criteria as applied in the authentication of FIG. 3. For example, time data obtained from the sensor data are compared with metadata relating to the sensor data.

If the age criteria are met, the sensor data is compared to 404 trusted real-world object data stored in the RWO data store 114. The automated comparison is performed using a trained machine learning and/or image processing apparatus. This is particularly relevant where the sensor data comprises a plurality of depictions of the real-world object 100, for example where the sensor data is a video of the object. Using selected frames of the video that show the real-world object 100 from different angles, the system processes those images using machine learning techniques to match features of the object identified in those frames with the same features from earlier sensor data, i.e. an earlier video. For example, if the real-world object 100 is an antique vase, video frames may be processed to identify a set of features relating to imperfections in the dimensions, surface, colour, or other features of the vase. If a predetermined threshold of features in the received video are matched with features identified in an earlier video, then the object can be considered to be authentic, and the assessment of condition proceeds.

If the age criteria is not met, an alert is triggered 402.

Figure 5:
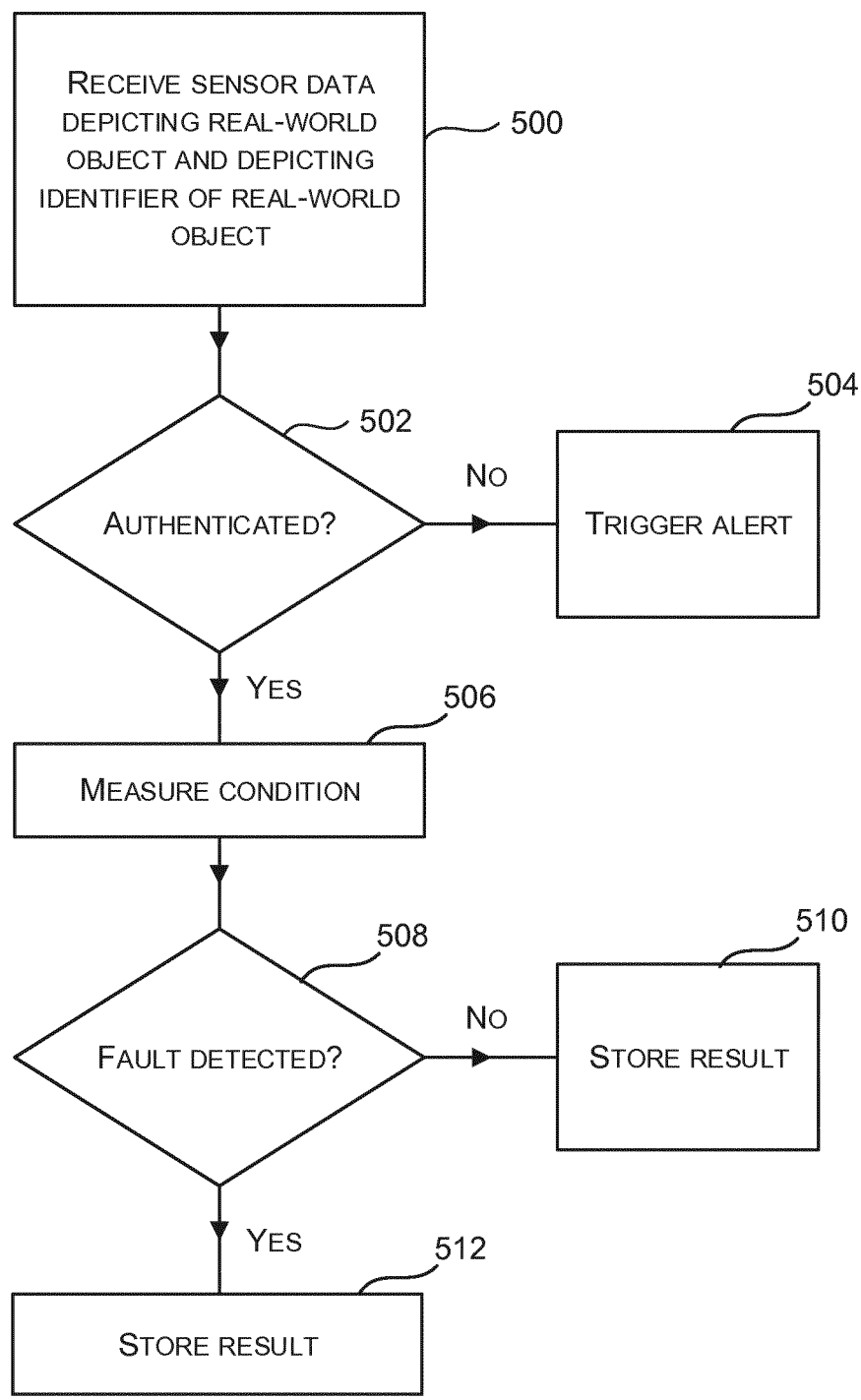
FIG. 5 is a flow chart illustrating another method of operation of the apparatus of FIG. 1 which the identifier and sensor data are integral.

In some embodiments, the identifier and sensor data are integral with one another. FIG. 5 illustrates a flow chart governing a method when the identifier and sensor data are integral.

Sensor data is received 500, at the processing unit 108, that depicts the real-world object 100 and an identifier of the real-world object. In an example, the sensor data is an image depicting an electronic device (which is the real-world object 100) with a display screen, where the display screen is displaying a two dimensional bar code encoding an identifier of the electronic device. Effectively, this step is a combination of the two initial receipt steps of the method of FIG. 2.

The sensor data is authenticated 502 to confirm that the sensor data depicts the real-world object 100 and the correct identifier. If the authentication is successful, the condition is measured 506 using sensor data. If the authentication is not successful, an alert is triggered 504. The authentication is carried out according to the steps of FIG. 3 and/or FIG. 4.

The outcome of the condition assessment is output and it is then decided if any faults are detected 508 in the real-world object 100. Information about whether a fault is or is not detected is stored 512.

While general operation of the system and the methods associated with it are described above, consideration will now be given to a subset of real-world objects, namely electronic devices with integral display screens and integral capture devices. The system and method as they relate to electronic devices, and particularly electronic devices having a display screen and a forward-facing camera, will be considered below with regard to FIGS. 6 to 13.

Figure 6:
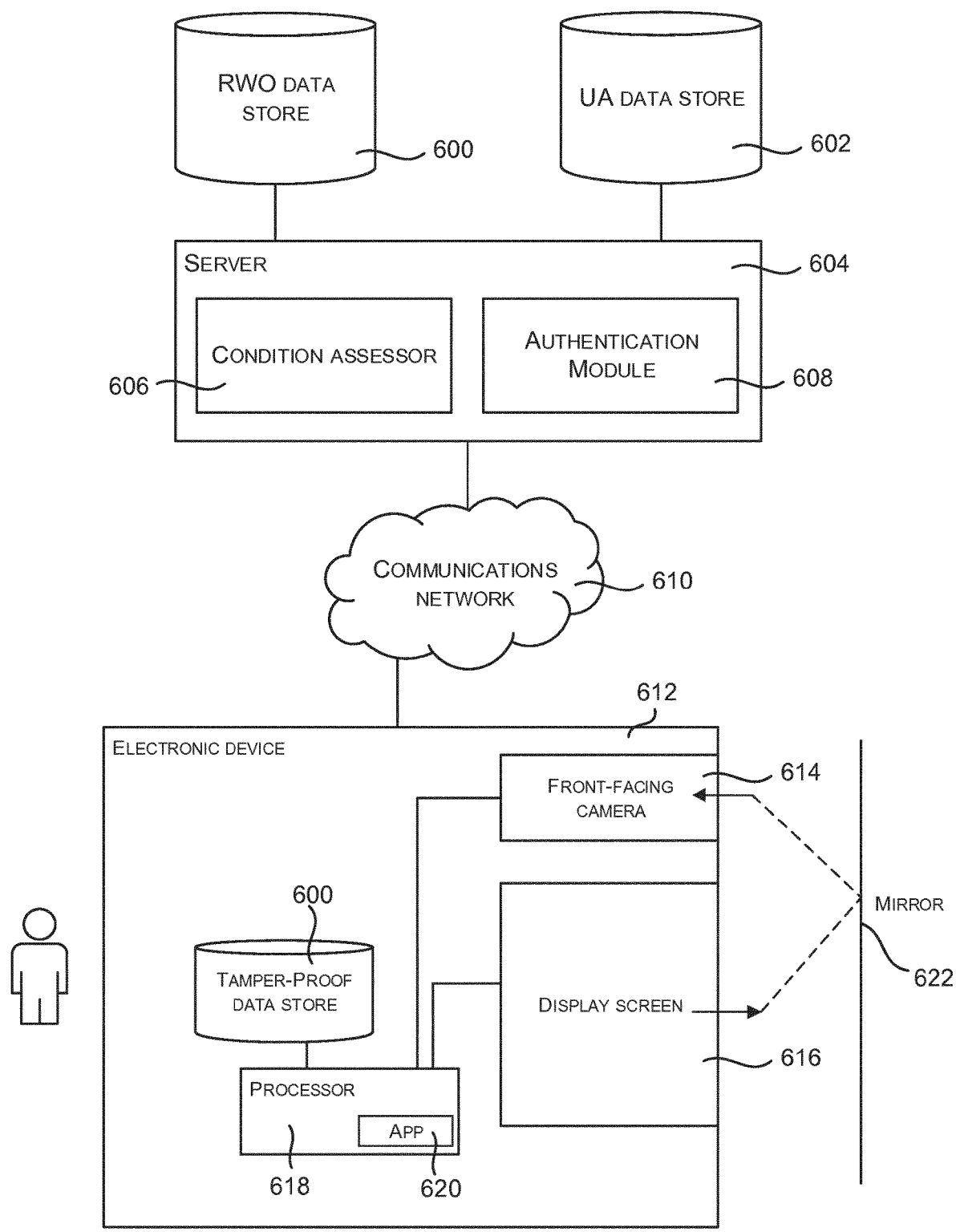
FIG. 6 is a schematic diagram illustrating the image processing apparatus of FIG. 1 used with a real-world object which is an electronic device.

FIG. 6 is a system diagram for embodiments in which the real-world object 100 is an electronic device 612. It will be appreciated that the system of FIG. 6 is not the only possible arrangement for use with electronic devices, and the system is arranged in other configurations without substantially departing from the scope of the invention.

The system comprises an electronic device 612 connected via a communications network 610 to a server 604. The server 604 includes a UA data store 602 and a RWO data store 600 and the processing unit.

The electronic device 612 is the real-world object 100 and includes a capture device. The electronic device 612 also includes a display screen 616 and a processor 618 running an application 620. The application 620 is able to control the operation of the display screen 616, capture device 614, and communication of information to and from the server 604 in order to implement the methods described herein. The electronic device 612 has a tamper proof store 600 holding an identifier of the electronic device 612 such as hardware in which the identifier is burnt into the device during manufacture, or any other tamper proof identifier store.

The electronic device has at least one display screen where the display screen has a field of view which is the field into which light emanating from the display screen projects. The capture device in FIG. 6 is a front-facing camera 614, i.e. an image sensor positioned so that its field of view is coincident with the field of view of the display screen of the electronic device 612.

In some examples the electronic device 612 has a rear-facing camera (not shown in FIG. 6), having a field of view in the opposite direction to that of the front-facing camera 614 on the rear face of the device 612, and/or facing away from the user, in use. The electronic device 612 may incorporate further output and/or input devices, such as a speaker, microphone, accelerometers, etc. (not shown in FIG. 6).

A mirror 622 is also shown in FIG. 6. The mirror 622 is part of the environment of the electronic device 612 and is not part of the electronic device 612 itself. In use, the electronic device 612 is able to, using the front-facing camera 614, capture sensor data comprising images of the front face of the device 612 by virtue of reflection of the front face of the device 612 in the mirror 622. If a rear-facing camera is also incorporated, the mirror 622 is usable to capture images of a rear-face of the electronic device 612.

Figure 7:
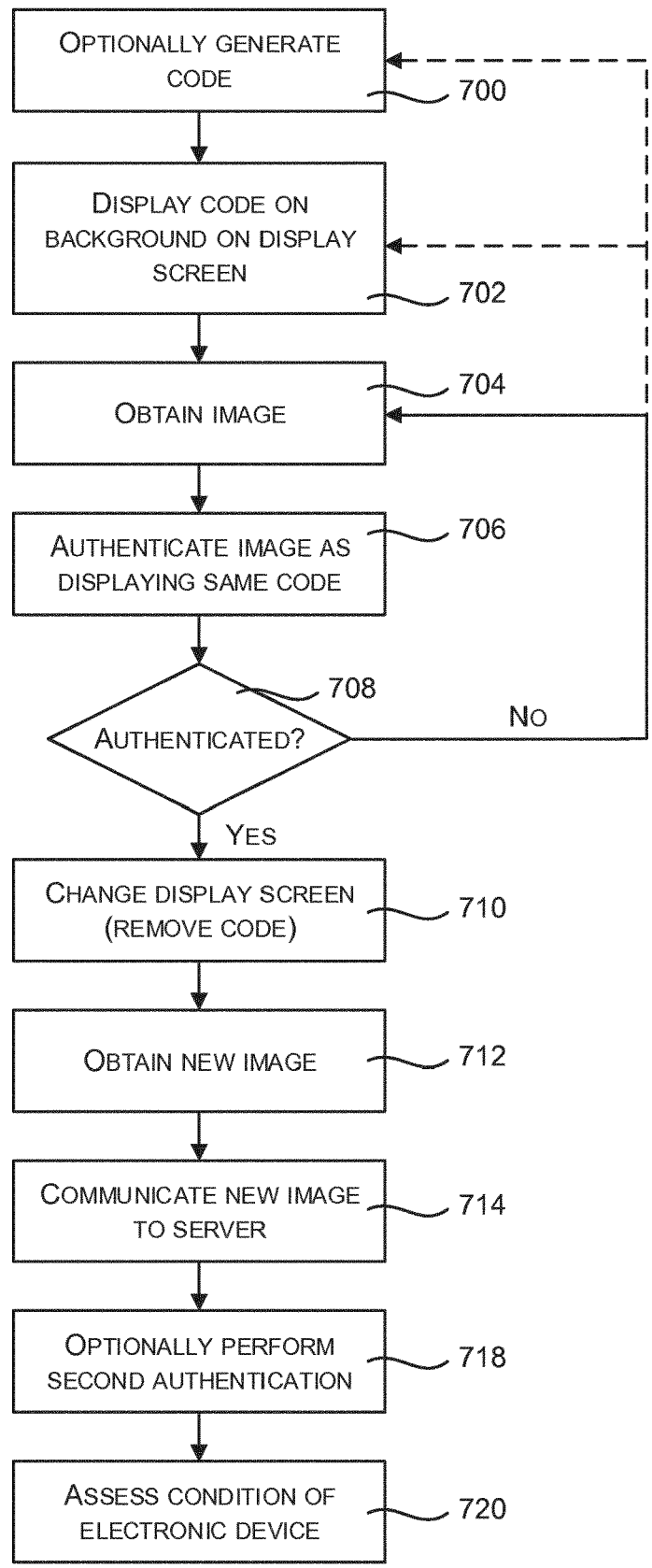
FIG. 7 is a flow chart illustrating a method of operation using the image processing apparatus and the electronic device of FIG. 6.
Figure 8:
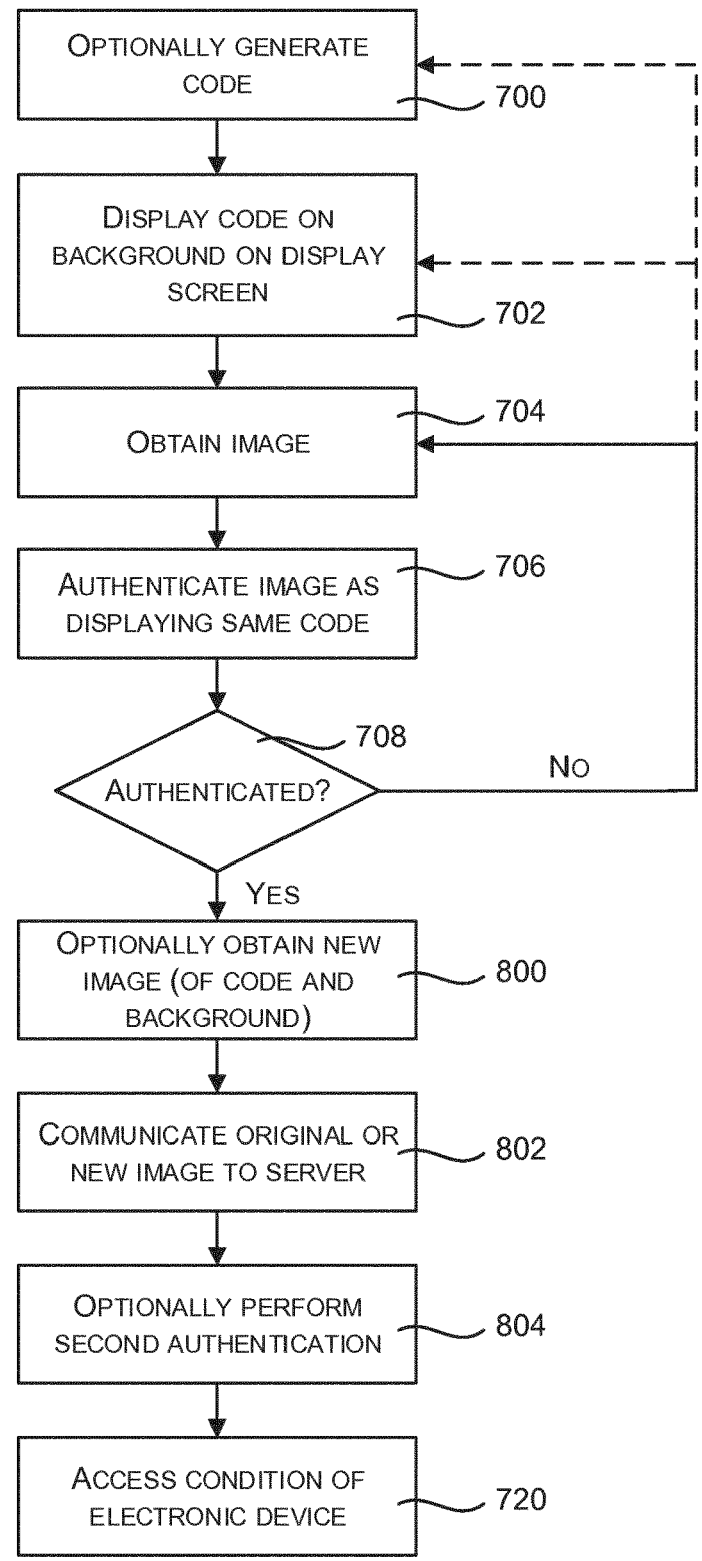
FIG. 8 is a flow chart illustrating another method of operation of the system of FIG. 6.

FIG. 7 and FIG. 8 each illustrate a method of operation of the system of FIG. 6. The method of FIG. 7 is similar to the method of FIG. 3 where an identifier is utilised but is not integral with the sensor data. FIG. 8 illustrates a method similar to that of FIG. 5, in which sensor data and the identifier are integral with one another.

With reference to FIG. 7, a code is optionally generated 700. The code, which comprises the identifier of the electronic device 612, is either generated by the application 620 being run on the processor 618 of the electronic device 612 or is generated by the server 604. The code is a two dimensional bar code, a barcode, an image, text, or any other graphical item that is able to be identified and read for the purpose of authentication of the data. In some examples the code incorporates age data about the age of the code. In some examples, 'generating' the code comprises accessing a data store and retrieving a relevant code.

In one example, where the electronic device is a mobile phone, the code is a two dimensional bar code and is generated by an application. The two dimensional bar code contains data that is specific to that mobile phone, such as the IMEI number or another unique numerical identifier. The two dimensional bar code also contains a timestamp indicating the time that the code was generated.

Figure 9:
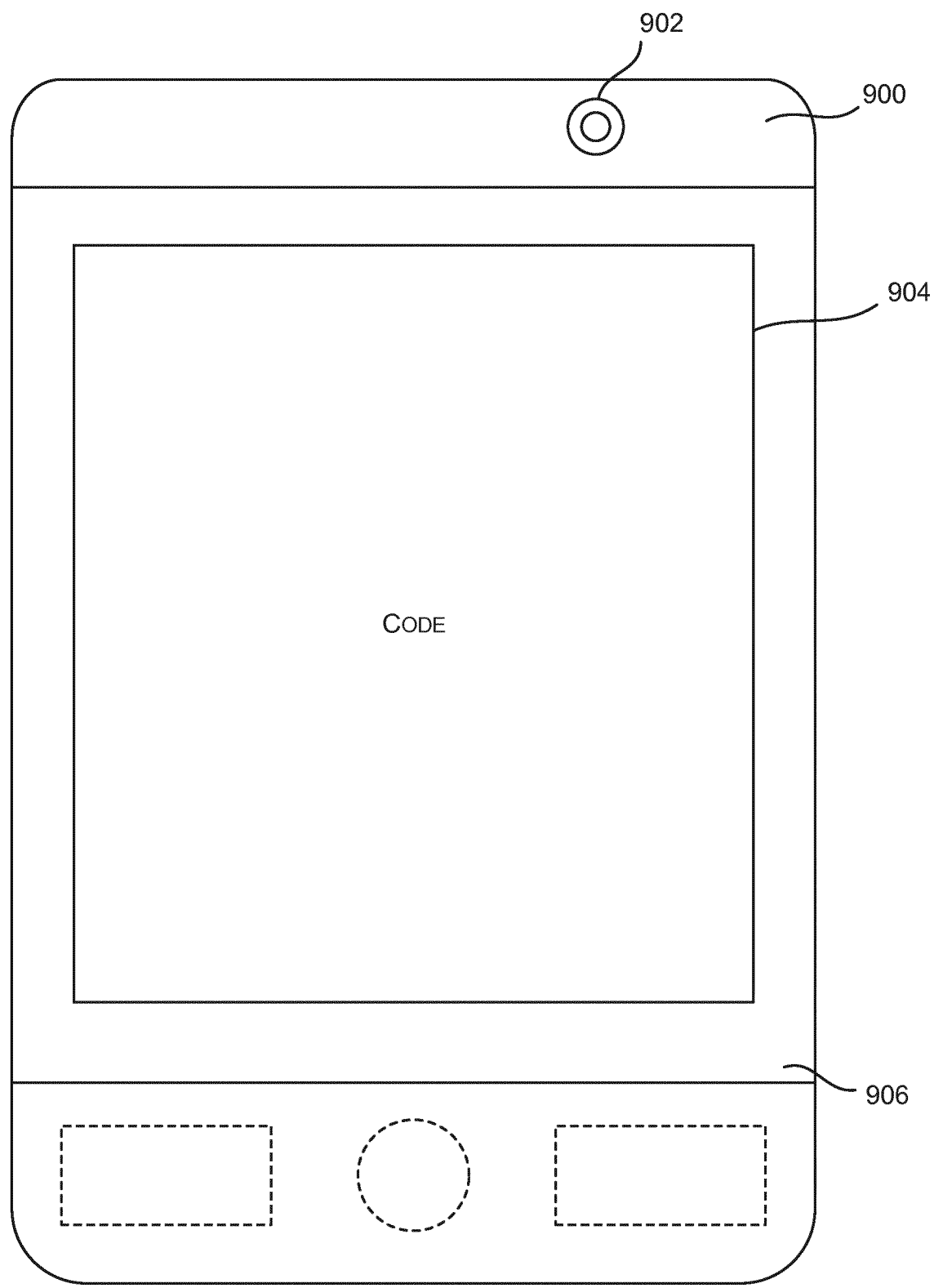
FIG. 9 is an example image of an electronic device for use in the system of FIG. 6 and methods of FIG. 7 or 8.

The code is displayed 702 on the display screen 616 of the electronic device 612. In an example the code occupies substantially all of the display screen 616. An example of this is shown in FIG. 9, which illustrates the front face 900 of an electronic device 612 including a front-facing camera 902 and a display screen 906. The display screen 906 includes the code 904 displayed against a background. In some embodiments, as will be described in relation to FIGS. 11a, 11b, and 12 below, the code may be in particular portions of the screen rather than occupying substantially all of the display screen.

When the code is displayed 702 on the screen, the electronic device's front-facing camera 614 is activated, whilst the electronic device 612 is positioned before a mirror 622 as indicated in FIG. 6, and sensor data, here images, are captured 704. The captured images are typically in the form of individual image frames. In some embodiments, the captured images may be in the form of a video. These embodiments will be discussed in more detail below.

One or more captured images captured by the electronic device are authenticated 706, 708 to confirm that the captured image depicts the specified electronic device 612 and not some other electronic device. Authentication is achieved using the code depicted in the images of the display screen 616 of the electronic device 612 which are reflected in the mirror 622.

The authentication is performed either by the electronic device 612 or by the server 604. If the authentication is performed by the server 604, at least one of the captured images is sent to the server 604 prior to the authentication, and the server 604 responds to the electronic device 612 after authentication indicating whether the authentication was successful or not.

Authentication is performed by identifying codes of the same format as the displayed code within the captured image. If no code can be identified in the captured image, the authentication fails and the process returns to the 'obtain image' step 704 as indicated in FIG. 7. If a predetermined time period has passed or a predetermined number of captured images have not contained a code, the process of FIG. 7 restarts. Restarting the process of FIG. 7 means that the code is re-generated, the code is displayed afresh, the process times out and terminates, and/or an alert is generated. The lack of a code in the captured images despite repeated attempts to identify a code indicates that fraudulent activity is being attempted by the user, and a flag is assigned to any subsequent captured images to apply extra security measures to determine whether fraudulent activity has taken place.

If the image is found to contain a code, information in the code is used to identify if it is considered to be equivalent, or the same, as the code initially displayed on the electronic device 612. The information, which discussed above is a timestamp and/or device-specific information such as an IMEI number, is extracted from the code in the captured image and tested. Alternatively, or additionally, the codes may be directly compared to one another without decoding the identifier from the code.

In the example where the electronic device 612 is a mobile phone, the timestamp found in the two dimensional bar code is compared against metadata of the captured image to identify the time lapsed between the code generation and the image being captured. The age of the two dimensional bar code is effectively determined. If the difference between the metadata and timestamp is found to be below a threshold then age criteria for the image is fulfilled.

Fulfilment of the age criteria may be just one requirement for authentication. The two dimensional bar code may also be subjected to a comparison of the device-specific information contained therein with the device-specific information of the device that generated and/or displayed the code. If the information of the code and the device match, then another requirement for authentication is fulfilled.

Regardless of the number of requirements for authentication, the sensor data can only be considered to be authenticated if all or a threshold number of requirements are fulfilled.

So, if the code is identified within the captured image, and the authentication requirements are fulfilled, it is considered to be more than likely that the electronic device displayed in the image is the same electronic device that displayed the code originally. In some embodiments, the identifier is not saved anywhere on the electronic device and so is inaccessible to the user unless they are using the application, which only generates identifiers within a time-limited period. This enhances the likelihood that the device is being depicted.

Having authenticated the captured image, the method updates 710 the display to remove the code in order to capture a new image for use in assessing the condition of the device 612. A new background is displayed in some embodiments, or the same background as was used previously. For example, the background is a plain white screen. Displaying a plain background makes defects in the display screen more prominent in subsequently captured images. If brightness values detected by the capture device are below a threshold the method prompts the user to turn on the lights or go into a brighter environment so that the captured image will be suitable for properly assessing the condition of the real-world object depicted in the captured image.

While the background without the code is being displayed, a new image (or plurality of new images) is captured 712 of the device with the background displayed on the display screen 616.

This image is then communicated 714 to the server 614 for assessment of the condition of the display screen 616 of the electronic device 612 using the new captured image. In some examples, the new captured image is communicated 714 to the server with the original image, and if the original image is communicated to the server, the server performs an optional second authorisation 718 using data in either of the data stores 604, 614.

Because the electronic device 612 has already been authenticated by presenting the electronic device 612 to itself via a mirror 622, it is hoped that the user will not have moved away from the mirror 622. It is preferable to remove the code from the display and capture the new image as quickly as possible after displaying the coded identifier, so that the user does not have time to turn the electronic device away or to use a different electronic device for the image.

During the removal of the code, display of the background only, and the obtaining of the new image, sensor data related to movement of the electronic device are monitored in some examples to identify any sudden movements of the device that indicate that the user has attempted to take a picture of a different device.

The image is subsequently assessed 720 for determining condition of the device 612. Further fraud prevention methods may be incorporated into the assessment step. For example, the condition assessor may be trained to identify movement artefacts, read non-reversed text (i.e. to indicate that the mirror is not present), distinguish the reflection of another device in the device screen from the device or identify a mirror frame to check the device is within the frame. A suitable assessment method is presented below in relation to FIG. 12.

Turning now to FIG. 8, an alternative to the method of FIG. 7 is laid out. In this method, the code is not removed from the background following authentication. Instead, the same code and background combination is used throughout the method.

As with the previous method, the optional generation 700 of the code and background is the first step, followed by display 702 of the combined code and background.

As in FIG. 7, images are obtained 704 and re-obtained until the code can be identified for the purposes of authentication. The authentication 706, 708 may comprise any suitable requirements, including the age criteria and/or device-specific information comparison.

FIG. 8 differs from FIG. 7 as the code is not removed after authentication has occurred. The code and background continue to be displayed on the display screen 616 of the device 612 after the authentication.

Following authentication, an optional step is to obtain 800 a new image of the code and background. Either this newly obtained image, or the image on which the authentication was based, is communicated 802 to the server 604. A second authentication may optionally be performed 804, and this may be performed by the server 604 after communication of the image/new image to the server 604, or may be performed on the new image by the electronic device 612 before sending the new image to the server 604. Only one image is required to be communicated to the server 604 because the new image and the original image both contain the identifier.

Using the image that has been communicated to the server 604, the condition of the display screen 616 of the electronic device 612 is determined and assessed 720. The same fraud detection features apply as described in relation to FIG. 7.

Using the combined code and background for both authentication and condition assessment further reduces the possibility of the user using a different electronic device for the assessment image. This is because the user is either: (a) unable to tell when the authentication has been completed and when a new image is being obtained for assessment purpose, or (b) the user is unable to take a new image of a different phone because the same image is being used for authentication and assessment.

However, it is not straightforward to accurately assess the condition of the electronic device using a captured image which depicts the electronic device and the code. The displayed code potentially interferes with the ability to detect cracks such as fine hairline cracks in the display screen of the electronic device. The displayed code acts as noise in the image of the electronic device and so potentially makes it difficult to accurately assess condition of the electronic device. The displayed code sometimes obscures cracks or fractures in the display screen. The displayed code is sometimes falsely detected as a crack or fracture in the display screen when the display screen is in fact faultless.

The image used for assessment needs to be adequate to enable any defects to be identified in the surface of the device display screen. As such, the combined code and background display needs to be sufficiently bright and/or sufficiently uniform to accurately illuminate the screen. A number of techniques may be used to ensure that a sufficiently uniform illumination is achieved.

A first technique is to create a code that is highly contrasted against the background (for example to improve the detection of the code for authentication). The method of FIG. 8 may then include an additional step prior to the assessment where pre-processing of the image is performed to reduce the contrast between code and background, or to artificially remove the code altogether. This technique may also make use of particular colours to improve the precision of the pre-processing. For example, two complementary colours may be used, one for the background and one for the code, and the image processing may comprise applying filters to reconcile the colours.

A second technique is to create a code and a background that have a very low contrast. The code is recognised for authentication purposes, but a low contrast, for example, where the code and background are two similar shades of one colour, is useful for removing doubt over the condition of the screen and achieving uniform illumination.

A third technique is to create a moving combined image to be displayed on the screen. The moving image may comprise the code fading into the background and back out. The method of FIG. 8 may therefore comprise obtaining multiple images, some in which the code is visible and highly contrasted and some in which the code is not visible at all. The images may be in the form of a video and multiple image frames may be processed to assess the condition.

In addition to the above, a trained machine learning system is used which has been trained to classify images of electronic devices displaying codes, as having cracked screens or not. In this method the presence of the code in the captured image is taken into account during the training process and so accuracy of the classifier is good even when codes are present in the captured images.

In some embodiments, more than one identifier is incorporated into sensor data. In the embodiments discussed above with reference to FIGS. 6 to 8, a further optical or acoustic identifier is used in addition to a code. For example, a coded sound is played during the process by the electronic device. The sound is inaudible to humans in some examples. The sound is recorded by a microphone, decoded, and authenticated by comparing the decoded information with known data. For example, the sound may comprise an identifier and timestamp for performing a comparison. In some examples where both a code and a sound are used, the information obtained from the code is compared directly with information obtained from the sound to provide an extra level of security.

In another example, the real world object is an electronic device with a display screen, such as a television or a laptop computer. The electronic device is capable of displaying an identifier such as a code which comprises an identifier of the electronic device 612. The code is displayed on the display screen of the electronic device by a first application being run on a processor of the electronic device. A second application being run on the processor of the electronic device has functionality to capture an image of the display screen of the electronic device using a suitable capture device which is in communication with the second application. The two applications coordinate with one another so that an image is captured of the display screen during the time when the display screen is displaying the code.

Figure 10A:
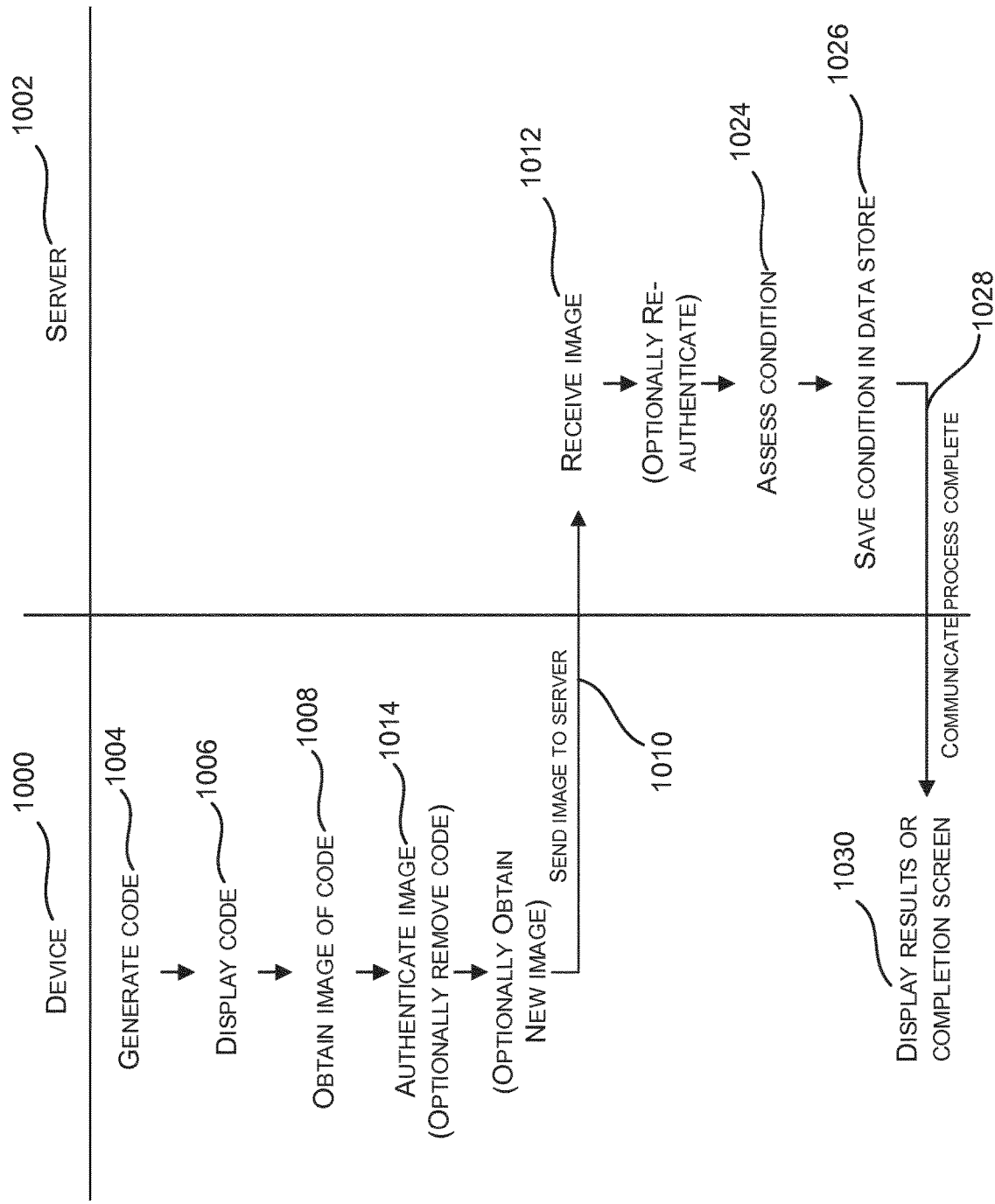
FIGS. 10a and 10b are operational timelines illustrating operations and data transfer between an electronic device and a server.
Figure 10B:
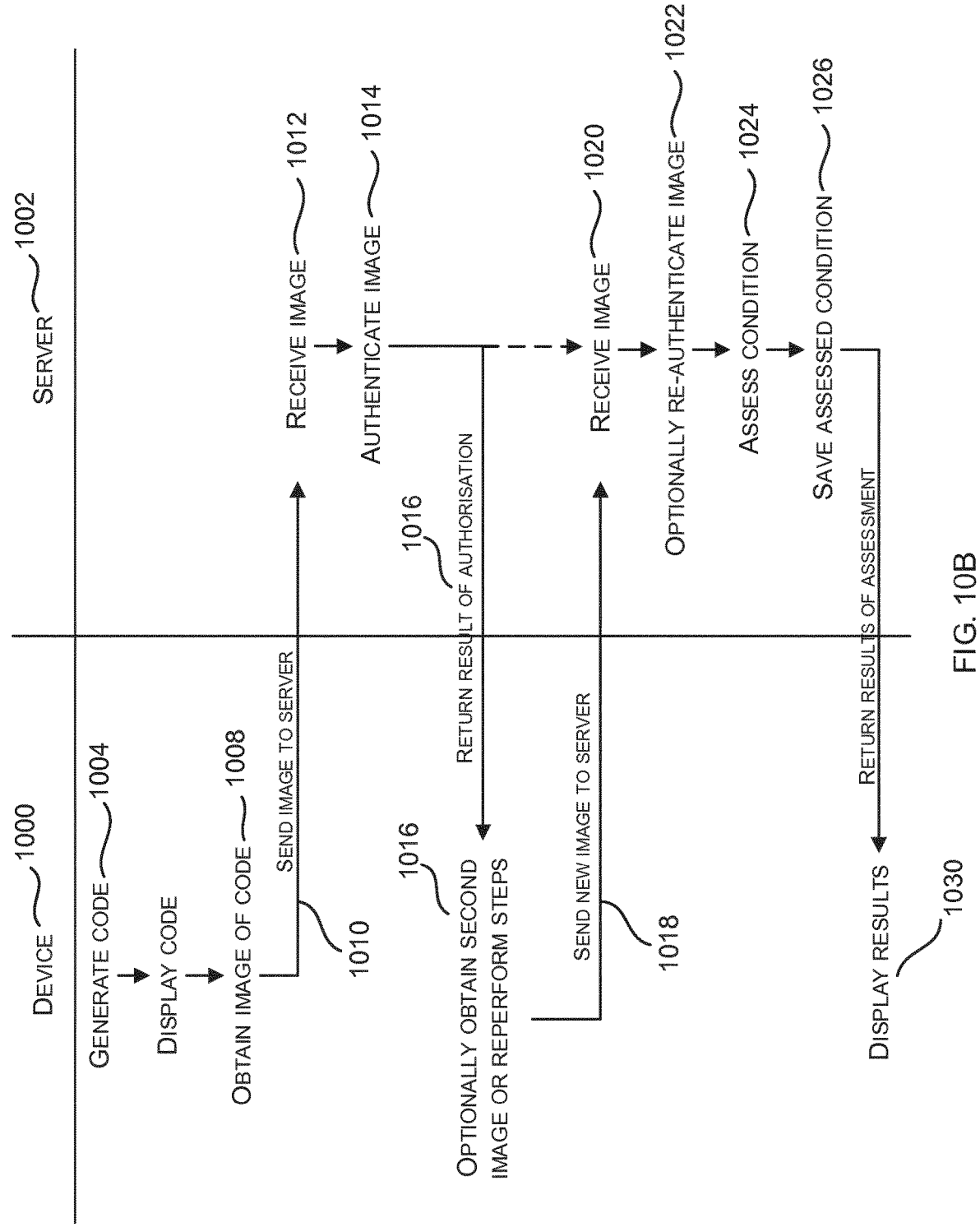

FIGS. 10a and 10b show the flow of information between the electronic device 1000 and the server 1002. FIG. 10a shows the flow of information when the electronic device performs the authentication of the captured sensor data, and FIG. 10b shows the flow of information when the authentication is performed by the server.

In FIG. 10a, the process involves a first half of the methods described above being performed at the electronic device 1000, before the second half of the method following authentication, is performed at the server 1002. The device optionally generates 1004 and displays 1006 the code, obtains 1008 an image, authenticates the image 1014, optionally removes the code and optionally obtains a new image. The image or new image is then sent 1010 to the server, which receives 1012 the image and optionally performs the second authentication. The server assesses 1024 the condition of the device based on the image, and stores 1026 the outcome in the relevant data store. The server communicates 1028 that the process is complete, optionally with results of the assessment, and this is displayed 1030 on the display screen of the device to the user.

In FIG. 10b, the device 1000 optionally generates 1004 the code and displays the code 1006. The device obtains 1008 an image and sends 1010 the image to the server 1002. The server receives 1012 the image and authenticates 1014 it. Depending upon the method being followed, the server either: returns 1016 results of the authentication to the electronic device for a second image to be captured and sent 1018 or a repeat of previous steps to be performed; or continues with the method, and to the assessment of the condition of the device if the authentication was successful. In either case, an image for authentication is received 1020 by the server, optionally re-authenticated 1022, and the condition is assessed 1024, the results saved 1026, and the results communicated 1028 to the device for display 1030.

Figure 11A:
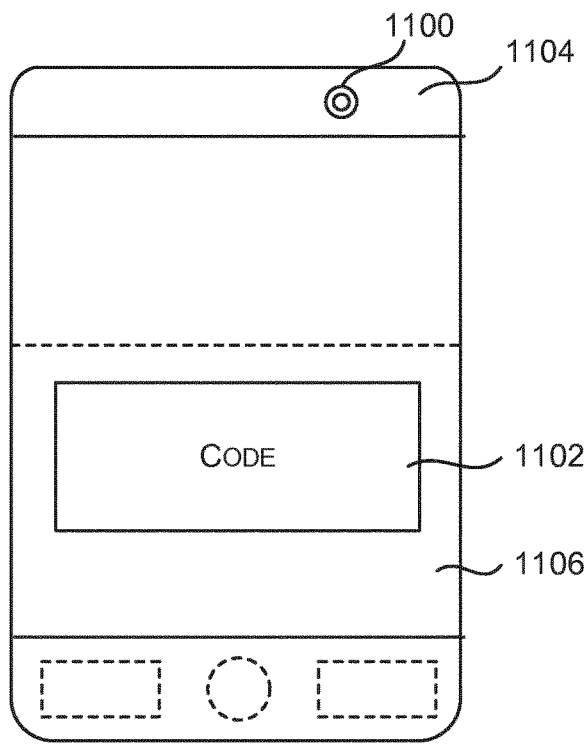
FIGS. 11a and 11b are example schematic images of an electronic device, each having an identifier displayed in a different portion of the display screen of the device.
Figure 11B:
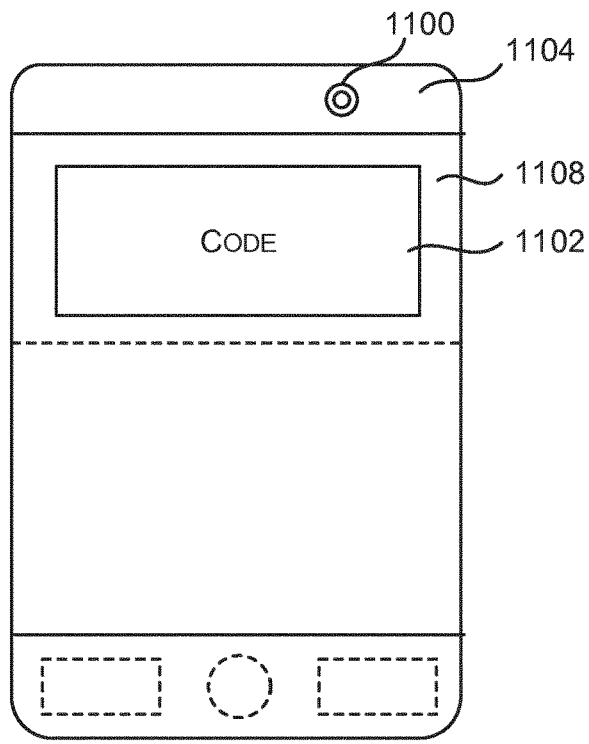

FIGS. 11a and 11b illustrate an electronic device having a code 1102 in different portions of the screen 1104, in this case upper and lower halves 1108, 1106 of the display screen. Using codes in different portions of the screen enables multiple images to be obtained and used for authentication and/or assessment. Doing so provides a higher level of accuracy in assessment of condition of the electronic device. Accuracy is improved since the portion of the display which has no code experiences no interference from the code. Because there is no non-uniformity in the portions of the captured images where the code is not depicted, those portions are assessed against the same background without requiring any pre-processing. By arranging the portions to cover the whole display screen when combined the condition of the whole screen is assessable.

Figure 12:
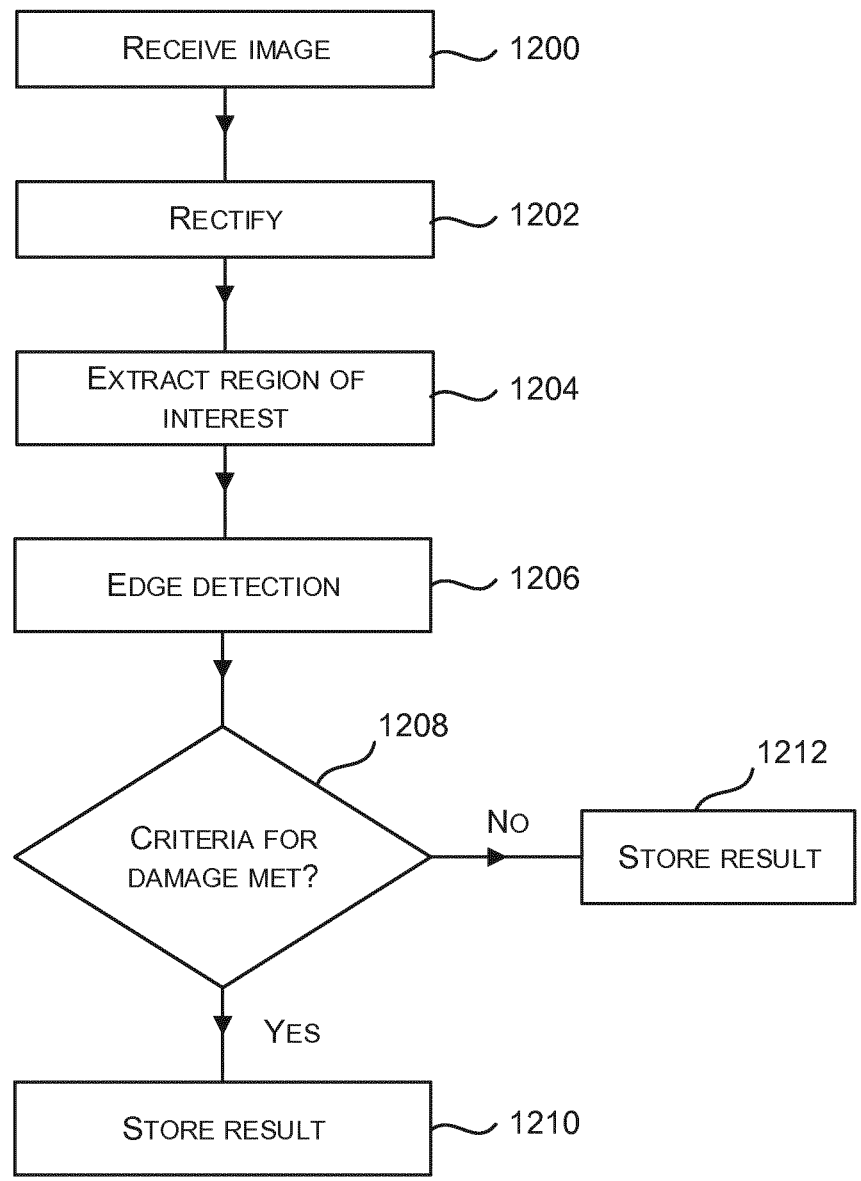
FIG. 12 is a flow chart illustrating a method of image processing by a condition assessor.

Considering the assessment of condition in more detail, FIG. 12 illustrates a method for image processing that is used by the condition assessor in some examples.

With reference to FIG. 12 an image is received 1200 by the condition assessor. The image is rectified 1202 using conventional image rectification methods and a region of interest is extracted 1204 from the rectified image. The region of interest is extracted using color histogram techniques or other background removal methods which are well known. A bounding box of the object in the region of interest is computed. If there is no object in the picture for which a bounding box can be created then the image is classified as invalid; otherwise the process proceeds.

The extracted region within the bounding box is converted to a greyscale image and a Gaussian blur is applied.

Edge detection 1206 is the carried out on the greyscale blurred region using a Canny edge detector or other edge detection process. A succession of dilation and erosion is then applied to the detected edges such that any detected edges join together.

Criteria for damage are then assessed 1208 using the detected edges. The criteria comprise factors such as the quantity, and connectedness of the detected edges as compared with specified thresholds. In an example, the criteria comprise detecting a threshold number of areas in the image which contain detected edges, by using a color segmentation using a watershed algorithm. If the number of areas is greater than a threshold then damage is detected.

If the criteria are met the condition of the electronic device depicted in the image is classified as damaged and the results are stored 1210. If the criteria are not met the condition of the electronic device depicted in the image is classified as invalid or undamaged and the result is stored 1212.

Figure 13:
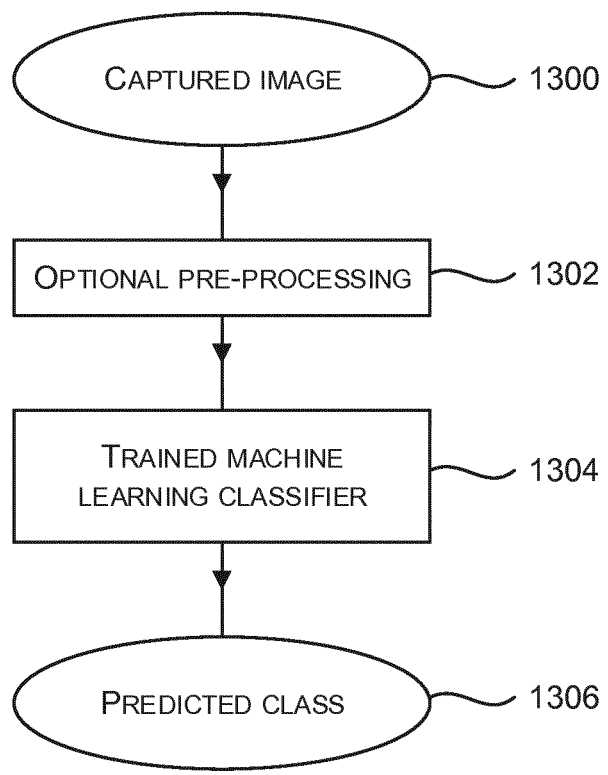
FIG. 13 is a flow chart illustrating another method of image processing by a condition assessor in the case where the condition assessor comprises a trained machine learning component.

In an example the condition assessor comprises a trained machine learning component which is a classifier. Any suitable classifier is used and a non-exhaustive list of examples is: neural network, support vector machine, random decision forest. The classifier is trained in advance using labelled training data. The labelled training data comprises images of electronic devices with display screens where the images are labelled as depicting a damaged display screen, an undamaged display screen, or being invalid by a human. Well known training processes are used to train the classifier using the labelled training data. Once trained the classifier is used as indicated in FIG. 13.

A captured image 1300 is optionally pre-processed 1302 to remove noise, rectify the image and enhance contrast. The image is input to the trained machine learning classifier 1304 which computes a predicted class 1306 from the potential classes: damaged, undamaged and invalid.

In some cases the captured image 1300 comprises a code displayed on a display screen of an electronic device depicted in the captured image as described in various examples herein. However, it is not essential for a code to be present.

In an embodiment which is found to give particularly good accuracy and robustness, the captured image 1300 is pre-processed 1302 using an object detector to detect the part of the captured image depicting the real-world object. Only the part of the captured image depicting the detected real-world object is input to the classifier. For example, the object detector is a trained neural network single shot detector, or a trained region convolutional neural network. A trained region convolutional neural network with 16 layers and 3×3 convolution filters is found to give particularly good results. The region convolutional neural network is trained with about 700 or more manually labelled training images to give particularly high accuracy and generalization ability. If the object detector is unable to detect an object in the captured image 1300 the process fails and an alert indicating that the object detection has failed is given. If the object detector detects an object such as a smart phone in the image it returns a bounding box of the object. The region of the image within the bounding box is extracted and input to a machine learning classifier which in this embodiment is a residual neural network. When the residual neural network has 18 layers and 3×3 convolutional filters using residual learning by block of two layers particularly good results are achieved although other numbers of layers (such as up to 152 convolutional layers), filter sizes and learning processes give working results. The residual neural network is trained using images of objects such as smart phones labelled as being damaged, undamaged or invalid.

In an example, the machine learning classifier comprises a neural network that is trained to classify the image into a predetermined category. In an example the neural network is a convolutional neural network trained using a deep learning method such as ResNet (Residual neural network). The neural network is trained using training data comprising existing images that heave been classified by humans according to the predetermined categories. For example, at least two categories may be defined: undamaged and damaged. Undamaged may encompass images depicting entirely undamaged objects and those showing objects having minor surface damage as might be expected during every day use. Damaged encompasses images showing objects with any other damage that is not considered routine. In some examples the damaged category is divided into a plurality of sub-categories indicating degrees of damage and/or types of damage.

In some examples, the neural network is trained with images that depict more that the object itself because it is unlikely that the object will form the entirety of the image that is communicated to the condition assessor. The surroundings of the object may include body parts of the user, or other possessions. These are details that may potentially confuse the classifier if not considered during training and which would causing the neural network to classify images incorrectly. It is found that training the neural network using images depicting electronic devices in an environment gives a robust, accurate solution. Having said that, using training images depicting only electronic devices also gives working results.

Figure 14:
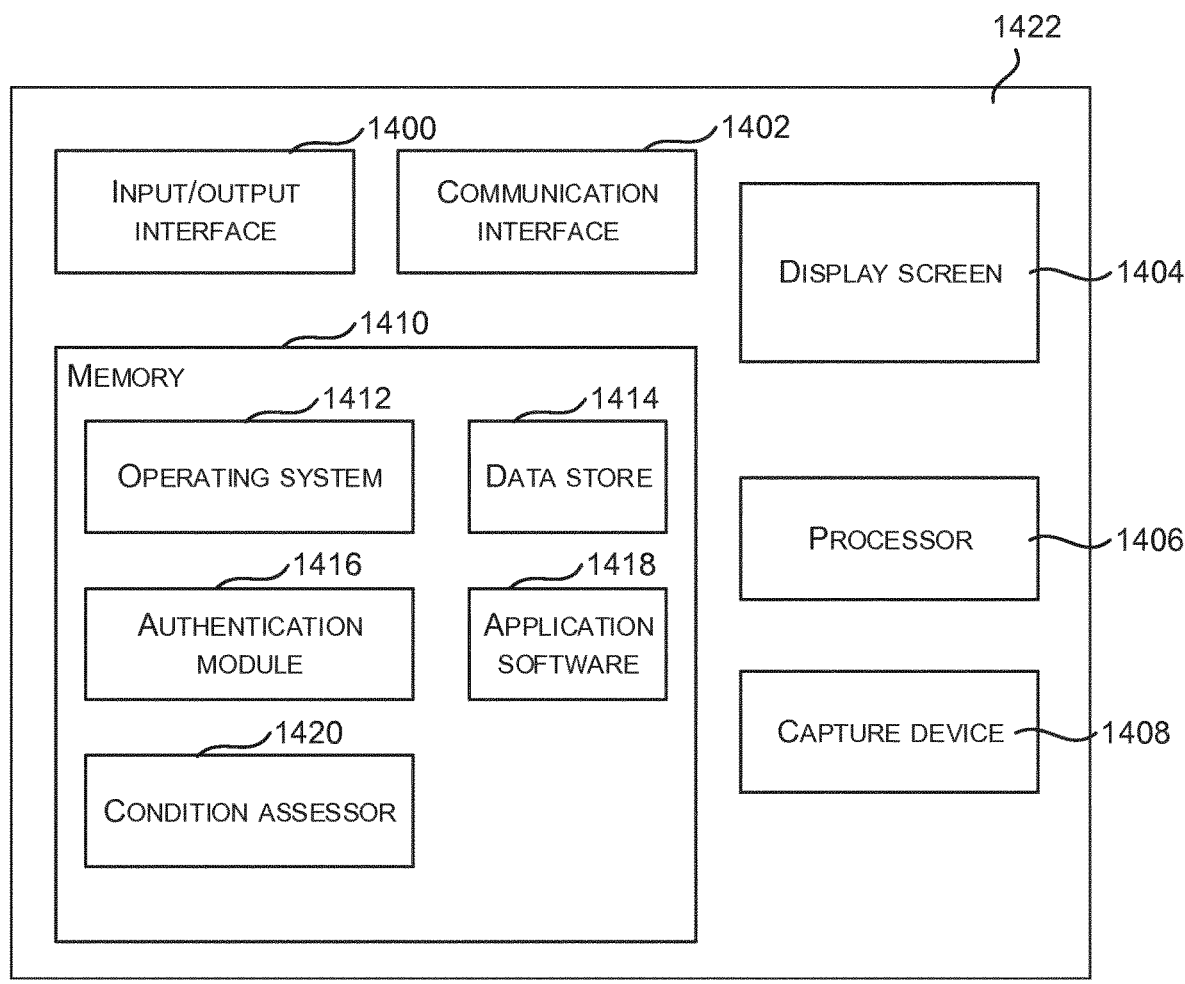
FIG. 14 is a schematic diagram of a computing device suitable for implementing an electronic device or a server according to the embodiments described herein.

FIG. 14 illustrates various components of an exemplary computing-based device 1422 which may be implemented as any form of a computing and/or electronic device, and in which embodiments of the invention may be implemented.

Computing-based device 1422 comprises one or more processors 1406 which may be microprocessors, controllers or any other suitable type of processors for processing computer executable instructions to control the operation of the device in order to implement at least part of the methods described above. In some examples, for example where a system on a chip architecture is used, the processors 1406 may include one or more fixed function blocks (also referred to as accelerators) which implement a part of the methods of described above in hardware (rather than software or firmware). Platform software comprising an operating system 1412 or any other suitable platform software may be provided at the computing-based device to enable application software 1418 to be executed on the device.

The computer executable instructions may be provided using any computer-readable media that is accessible by computing based device 1422. Computer-readable media may include, for example, computer storage media such as memory 1410 and communications media. Computer storage media, such as memory 1410, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 1410) is shown within the computing-based device 1422 it will be appreciated that the storage may be distributed or located remotely and accessed via a network or other communication link (e.g. using communication interface 1402).

The computing-based device 1422 also comprises an input/output controller 1400 arranged to output display information to a display device 1404 which may be separate from or integral to the computing-based device 1422. The display information may provide a graphical user interface. The input/output controller 1400 is also arranged to receive and process input from one or more devices, such as a user input device 1400 (e.g. a mouse or a keyboard). In an embodiment the display device 1404 may also act as the user input device 1400 if it is a touch sensitive display device. The input/output controller 1400 may also output data to devices other than the display device. The computing-based device 1422 also comprises a capture device 1408, and the memory 1410 comprises an authentication module 1416 and a condition assessor 1420.

Examples include any combination of the following clauses.

Clause A. A computer-implemented method of assessing the condition of a real-world object comprising:
receiving sensor data depicting the real-world object;
authenticating the received sensor data as genuinely depicting the real-world object; and if the authentication is successful, assessing a condition of the real-world object from the sensor data. By authenticating the received sensor data security is improved since the condition is assessed using appropriate sensor data rather than spoofed sensor data.

Clause B. The method of clause A wherein the authentication comprises checking an age of the sensor data and if the age is below a threshold, comparing the received sensor data with trusted data about the real-world object. Using the age of the sensor data as a way to authenticate the sensor data is an efficient and practical way of achieving authentication which is found effective in practice.

Clause C. The method of clause A comprising receiving an identifier of the real-world object in association with the received sensor data, and wherein the authenticating comprises searching for a match to the identifier in user accounts comprising details of users and associated real-world objects. Having an identifier received in association with the sensor data provides a practical and efficient way of authenticating.

Clause D. The method of clause C wherein the identifier is a graphical item and the received sensor data comprises one or more images depicting both the graphical item and the real-world object. Where the identifier is a graphical item security is enhanced since it is difficult to spoof the graphical item depicted in the image of the real-world object.

Clause E. The method of clause D wherein the one or more images depicting both the graphical item and the real-world object are used to assess the condition of the real-world object. Using the one or more images to do both tasks, that is, authentication and assessment, is a particularly efficient method which reduces the amount of data to be stored and processed. Using the images to do both tasks also enhances security since it is harder to spoof but makes it more difficult to assess the condition since the graphical item acts as noise or interference with respect to the condition assessment.

Clause F. The method of clause D wherein the one or more images depicting both the graphical item and the real-world object are used to assess the condition of the real-world object by inputting the one or more images to a trained machine learning system. Using a trained machine learning system is found to be a particularly effective way of overcoming the noise or interference introduced as a result of using the images to do both tasks (condition assessment and authentication).

Clause G. The method of clause D wherein the one or more images depict the graphical item on a display screen of the real-world object. Depiction on a display screen provides a practical and user friendly way of operating the graphical item for authentication.

Clause H. The method of clause G wherein one of the images depicts the graphical item at a first portion of the display screen of the real-world object and a second one of the images depicts the graphical item at a second portion of the display screen of the real-world object, different from the first portion. In this way accuracy is improved since interference and/or noise introduced by the graphical item is in different portions of the images.

Clause I. The method of any preceding clause, wherein authenticating the received sensor data comprises authenticating a first portion of the sensor data, and assessing a condition of the real-world object from the sensor data comprises assessing a condition of the real-world object from a second portion of the sensor data, the second portion being different to the first portion. In this way accuracy is improved since interference and/or noise introduced by a graphical item is in a different portion of the senor data used for condition assessment.

Clause J. The method of clause I, wherein receiving sensor data depicting the real-world object comprises receiving the second portion of the sensor data in response to the authentication being successful. By using a two stage process security is improved since the process only proceeds to condition assessment if authentication is successful.

Clause K. An electronic device comprising a processing unit and memory having computer-executable instructions thereon which, when executed on the processing unit, cause the processing unit to perform the method of any preceding claim.

Clause L. A computer-implemented method of assessing the condition of a real-world object in the form of an electronic device, the method comprising:
obtaining, using the electronic device, sensor data depicting the electronic device; authenticating the obtained sensor data as genuinely depicting the electronic device; and if the authentication is successful, sending sensor data depicting the electronic device to a condition assessor configured to perform computer-implemented assessment of the condition of the electronic device from the sensor data. By sending the sensor data to a condition assessor which is in the cloud for example, practical deployment of the technology as a cloud service is enabled.

Clause M. The method of clause L wherein the authentication comprises checking an age associated with the sensor data, and wherein the success of the authentication is based at least in part on the age being below a threshold. This provides a fast and effective way of authentication.

Clause N. The method of clause M, wherein checking an age associated with the sensor data comprises retrieving time data contained within the sensor data, and comparing the time data with a time metadata relating to of the sensor data to determine the age. This provides a fast and effective way of authentication.

Clause O. The method of any of clauses L to N, wherein the authentication comprises comparing the received sensor data with trusted data relating to the electronic device, and wherein the success of the authentication is based at least in part on identifying that the sensor data matches the trusted data. Making a comparison in this way enables authentication for a wide variety of types of real world object.

Clause P. The method of clause O, comprising receiving an identifier of the electronic device in association with the received sensor data, and wherein comparing the received sensor data with trusted data about the electronic device comprises determining that the identifier is equivalent to an earlier identifier generated before receiving the sensor data. This provides an efficient and accurate way of authentication.

Clause Q. The method of clause P wherein the identifier comprises device-specific data, and wherein determining that the identifier is equivalent to an earlier identifier generated before receiving the sensor data comprises retrieving the device-specific data from the identifier and comparing the device-specific data with device-specific data stored on the electronic device. This provides an efficient and accurate way of authentication Clause R. The method of clause Q wherein the identifier is a graphical item and the received sensor data comprises one or more images depicting both the graphical item and the electronic device. Including the graphical item in the sensor data enhances the security since spoofing is harder.

Clause S. The method of clause R wherein the one or more images depicting both the graphical item and the electronic device are sent to the condition assessor. Thus cloud service deployment is facilitated.

Clause T. The method of clause R or clause S wherein the one or more images depict the graphical item on a display screen of the electronic device, and wherein the sensor data is a mirror image of the display screen obtained by the electronic device using a forward-facing camera. This provides a practical and intuitive way for end users and it improves security and prevents fraud since the possibility of spoofing is reduced.

Clause U. The method of any of clauses Q to T wherein one of the images depicts the graphical item at a first portion of the display screen of the electronic device and a second one of the images depicts the graphical item at a second portion of the display screen of the electronic device, different from the first portion. As mentioned above this improves accuracy of condition assessment whilst still enabling security.

Clause V. An electronic device having a processing unit and memory having computer-executable instructions thereon which, when executed on the processing unit, cause the processing unit to perform the method of any of clauses L to U.

Clause W. A computer program product comprising instructions, which, when the program is executed by a computer cause the computer to carry out the steps of the method of any of claims A to J or of any of clauses L to U.

Clause X. A computer-readable storage medium comprising instructions which, when executed by a computer, cause the computer to carry out the steps of the method of any of clauses A to J or of any of clauses L to U.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

What is claimed is:

1. A computer-implemented method of assessing a condition of a real-world object, the method comprising:
receiving sensor data depicting the real-world object, the real-world object comprising an electronic device, the sensor data comprising one or more images depicting a graphical item on a display screen of the real-world object, the graphical item comprising an identifier of the real-world object, the identifier comprising device-specific data;
wherein one of the images depicts the graphical item at a first portion of the display screen of the real-world object and a second one of the images depicts the graphical item at a second portion of the display screen of the real-world object, different from the first portion;
authenticating the received sensor data as genuinely depicting the real-world object by searching for a match to the identifier in user accounts comprising details of users and associated real-world objects, wherein:

said authenticating comprises comparing the received sensor data with trusted data relating to the electronic device, wherein success of the authentication is based at least in part on identifying that the sensor data matches the trusted data;

said comparing comprises determining the identifier is equivalent to an earlier identifier generated before receiving the sensor data; and said determining further comprises:
   retrieving the device-specific data from the identifier; and
   comparing the device-specific data with device-specific data stored on the electronic device; and if the authentication is successful, assessing the condition of the real-world object from the sensor data by sending the sensor data depicting the electronic device to a condition assessor configured to perform computer-implemented assessment of the condition of the electronic device from the sensor data.

2. The method of claim 1, wherein the authentication comprises checking an age of the sensor data and if the age is below a threshold, comparing the received sensor data with trusted data about the real-world object.

3. The method of claim 1, wherein the one or more images are used to assess the condition of the real-world object by inputting the one or more images to a trained machine learning system.

4. The method of claim 1, wherein authenticating the received sensor data comprises determining if age criteria are met for the identifier and if the age criteria are met, proceeding to search for the match to the identifier in user accounts.

5. The method of claim 1, wherein the authentication comprises checking an age associated with the sensor data, and wherein the success of the authentication is based at least in part on the age being below a threshold.

6. The method of claim 5, wherein said checking of the age associated with the sensor data comprises retrieving time data contained within the sensor data, and comparing the time data with a time metadata relating to the sensor data to determine the age.

7. The method of claim 1, wherein the one or more images are mirror images of the display screen obtained by the electronic device using a forward-facing camera.

8. The method of claim 1, wherein the sensor data comprises sensor data related to movement of the electronic device.

9. An electronic device having a processing unit and memory having computer-executable instructions thereon which, when executed on the processing unit, cause the processing unit to perform the method of claim 1.

10. A non-transitory computer-readable storage medium comprising instructions which, when executed by a computer, cause the computer to carry out the steps of the method of claim 1.

* * * * *